Oct. 27, 1959 H. S. VASILEVSKIS 2,910,618

ELECTRICAL SYSTEMS

Filed May 8, 1956 6 Sheets-Sheet 1

INVENTOR.
HENRY S. VASILEVSKIS
BY
[signature]
ATTORNEY

Oct. 27, 1959 H. S. VASILEVSKIS 2,910,618

ELECTRICAL SYSTEMS

Filed May 8, 1956 6 Sheets-Sheet 2

INVENTOR.
HENRY S. VASILEVSKIS
BY
Dean V. Hazeltine
ATTORNEY

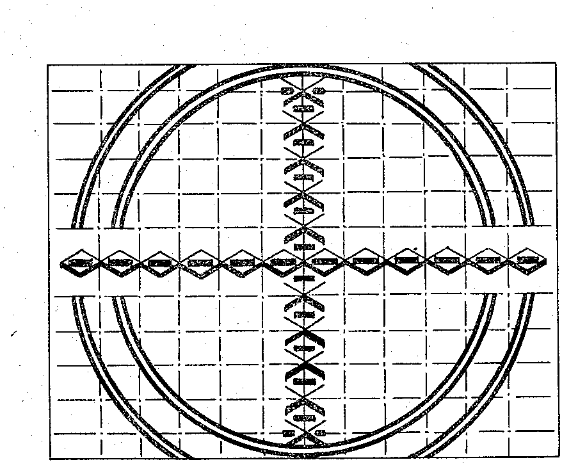
FIG. 6.
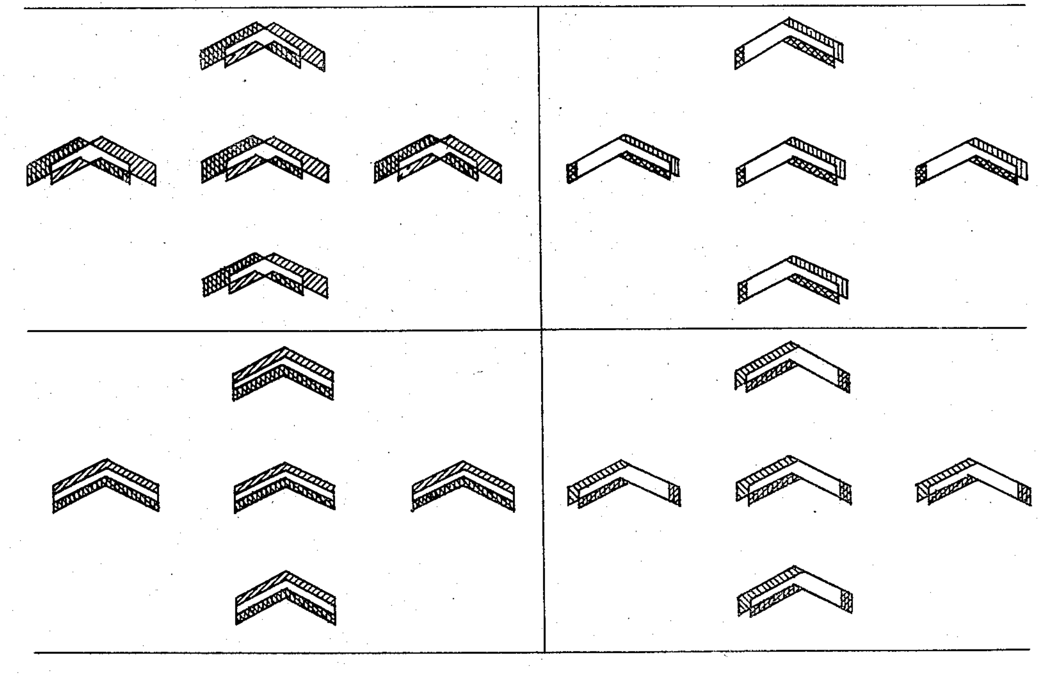
FIG. 7a. FIG. 7c. FIG. 7b. FIG. 7d.
INVENTOR.
HENRY S. VASILEVSKIS
BY
[signature]
ATTORNEY Oct. 27, 1959 H. S. VASILEVSKIS 2,910,618

ELECTRICAL SYSTEMS

Filed May 8, 1956 6 Sheets-Sheet 4

LEGEND

B W Y G MAG.

INVENTOR.
HENRY S. VASILEVSKIS
BY
[signature]
ATTORNEY

Oct. 27, 1959 H. S. VASILEVSKIS 2,910,618
ELECTRICAL SYSTEMS
Filed May 8, 1956 6 Sheets-Sheet 5
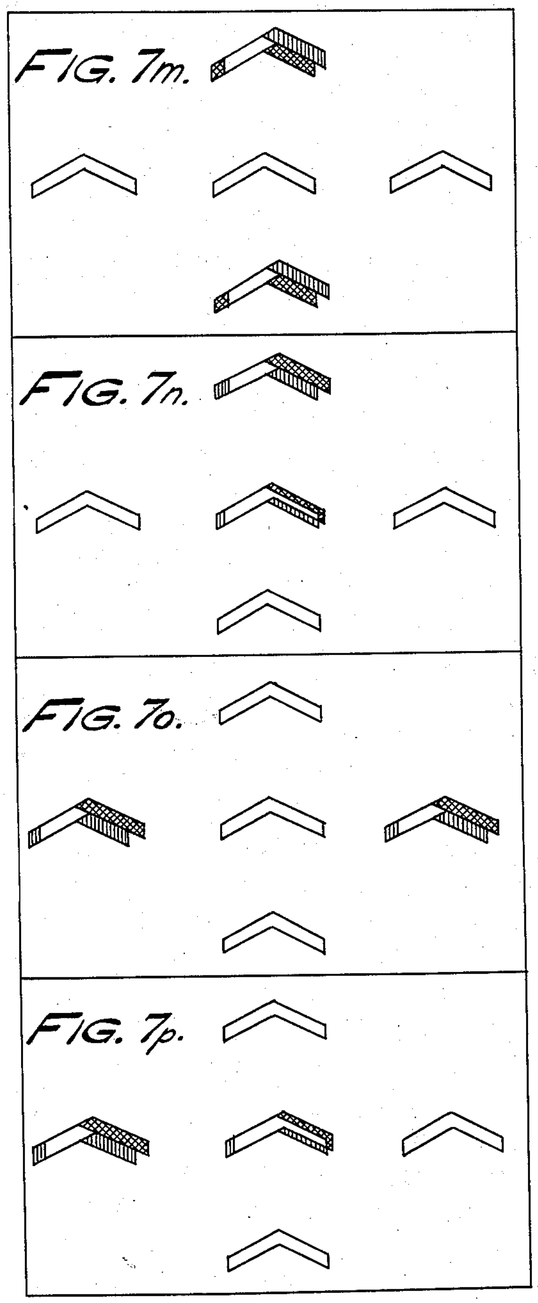
FIG. 7m. FIG. 7n. FIG. 7o. FIG. 7p.
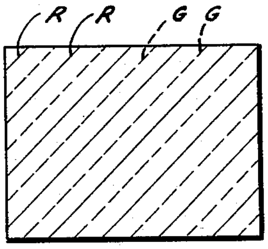
FIG. 8a.
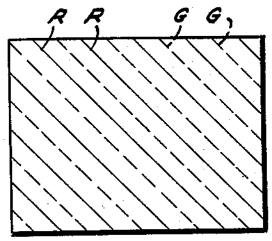
FIG. 8b.
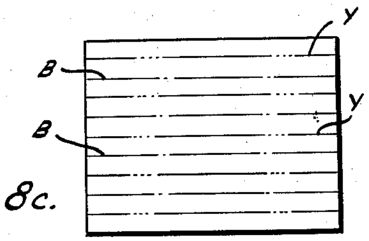
FIG. 8c.
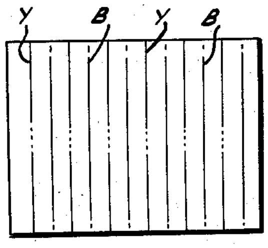
FIG. 8d.
INVENTOR.
HENRY S. VASILEVSKIS
BY
[signature]
ATTORNEY INVENTOR.
HENRY S. VASILEVSKIS
BY
[signature]
ATTORNEY 2,910,618

ELECTRICAL SYSTEMS

Henry S. Vasilevskis, Philadelphia, Pa., assignor to Philco Corporation, Philadelphia, Pa., a corporation of Pennsylvania Application May 8, 1956, Serial No. 583,402

11 Claims. (Cl. 315—13)

This invention relates to methods and apparatus for adjusting the relative positions of the several beams of a plural beam cathode ray tube. In particular the invention relates to methods and apparatus for adjusting the relative positions of the areas of impingement of the several electron beams produced within certain types of cathode ray tubes for reproducing television images.

Among the various types of image reproducing devices used in color television receivers is one known as the "aperture mask" or "shadow mask" tube. This is an image reproducing tube consisting of a screen which contains a plurality of sets of phosphor "dots," the dots of each set being emissive of light of different color as, for example, one of the additive primaries red, blue green. These phosphor dots are disposed in a recurrent sequence on the inner surface of the faceplate of the cathode ray tube (or on any other appropriate transparent substrate). They are arranged in "triads," i.e., groups each containing a red, a blue and a green color emissive phosphor dot approximately equally spaced from one another. Within the tube there are three electron guns for generating three electron beams, each of which ideally should impinge only upon phosphor dots emissive of only one of the primary colors when deflected over the screen. Accordingly one of the beams (hereinafter known as the "blue beam") is modulated in intensity by signals representative of the blue information present in the televised scene, and is arranged so as to impinge only upon phosphor dots emissive of blue light. The other two beams (hereinafter known respectively as the "red beam" and the "green beam") are modulated in intensity by signals representative of the red and green information in the televised scene and are arranged to impinge only upon red and green emissive phosphor dots respectively. To assist in insuring that these three beams impinge on the proper phosphor dots, a so-called "aperture mask" or "shadow mask" is interposed between the electron guns and the fluorescent screen. The aperture mask has one-third as many perforations or apertures therein as there are phosphor dots on the fluorescent screen. Each perforation is aligned with just one of the triads of phosphor dots. The perforations are so disposed that, if the beams approach the screen at the proper angles, the unperforated portions of the aperture mask will prevent the beams from striking the wrong phosphor dots. If it is desired, for example, to produce a while element in the reproduced image, the red, green and blue beams should cross over in one of the perforations of the mask whence they diverge slightly and strike the red, green and blue phosphor dots of the triad aligned with the aperture in which they converged. If the tube is to produce a magenta (red+blue) colored image element, the red and blue beams (the green beam being cut off) should cross over in one of the perforations of the mask and should then diverge before striking the red and blue phosphor dots of the triad associated with the latter perforation. For proper color fidelity in the image, the beams should cross over in the respective perforations of the aperture mask aligned with the triads which are successively impinged upon as the beams are scanned over all points of the fluorescent screen. It is relatively simple to cause the beams to cross over in the apertures in any given restricted area of the aperture mask, as for example, in apertures thereof near the center of the screen. However the faceplate and the aperture mask are both somewhat curved, and the radius of curvature is not constant, so that the beams, in the absence of any correction, do not cross over in the perforations of the aperture mask when the beams are scanned over parts of the screen to the left, right, above, or below the center of the screen. Instead, they cross over at points intermediate the mask and the electron guns. Because of the fact that the beams cross over behind the mask it is possible that, at a time when it is desired that the beams produce a white image element, the red and blue beams may pass through one particular aperture, while the green beam may pass through a different aperture which is lower than the other aperture. Even if all the beams impinge on the right phosphor dots, the phosphor dots struck by the red and blue beams belong to a triad higher than the one whose green phosphor dot is struck by the green beam. Therefore the phosphors of the triad struck by the red and blue beams will cooperate to produce a magenta colored image element; the lower triad struck by the green beam will emit green (which may later be mixed visually with other colors if the red and blue beams, when being swept lower, also pass through the same perforation). Thus where the beams do not cross over one another in one of the perforations, i.e., at the sides and at the top and bottom of the raster, the color fidelity of the image will be considerably degraded.

In order to overcome the effects of improper cross over of the beams certain corrective measures have heretofore been resorted to. In recent types of the shadow mask tube, apparatus which is mounted external to the tube has been provided for adjusting and correcting the convergence of the several beams. This apparatus includes a congergence magnet assembly which is positioned about the neck of the tube intermediate the deflection yoke and the electron guns. This assembly consists of three coils wound around three respective cores, and three adjustable permanent magnets, each of which is situated in spaces provided therefor in the respective cores. Each coil and core, and its associated permanent magnet, is so positioned that its magnetic field causes a corresponding one of the beams to shift in position in only one direction transverse to the central ray of the beam. Furthermore, the respective directions in which the beams can be moved are displaced approximately 120° from one another.

The convergence apparatus, in recent types of shadow mask tubes, also includes a permanent magnet external to the tube placed about its neck between the convergence magnet assembly and the electron guns. This magnet, which is usually known as the "blue lateral positioning magnet," enables the blue beam, to be shifted in position in a direction transverse to the direction in which it can be moved by the part of the convergence magnet assembly associated therewith.

In order to direct the magnet fields created by component parts of the convergence assembly to the area directly in front of the electron guns which produce the respective beams whose positions they influence, each of the electron guns is flanked by a pair of internal magnetic pole pieces. These pole pieces also help to minimize interaction between the guns. There are also internal pole pieces for guiding the field of the blue lateral positioning magnet so as to influence the position of the blue beam.

The permanent magnets of the convergence magnet assembly and the blue lateral positioning magnet are used to adjust for "static convergence" of the several beams—that is the adjustment of the positions of the several beams so that, in the absence of any deflection, and when modulated by signals corresponding to a white colored object, they will strike the centrally located triads to produce a white spot in the center of the raster.

In order to converge the several beams properly as they are being deflected, so that, for example, when modulated by signals corresponding to a white object, they will cause the production of white at all points on the screen, it is customary to apply corrective waveforms to the electromagnetic components of the convergence magnet assembly. These waveforms energize the electromagnets in such a fashion that the fields produced in response thereto cause the beams to cross over approximately in the perforations of the shadow mask at all points in the pattern of scanning. In general, as the beams are swept from one side to the other of the screen, the amount of misconvergence is large at the extreme left, diminishes gradually to a minimum in the center, and increases to a second maximum on the extreme right. A similar condition prevails as the beam is deflected down from the top of the raster to the bottom, i.e., the error is greatest at the top and bottom and decreases gradually to a minimum at the center of the raster measured in a vertical direction. More precisely, it has been found that the deviation of the apertures from an arc of true cross over, when plotted both with respect to the distance from the horizontal axis of the screen and with respect to the vertical axis thereof, results in parabolic curves. It is therefore possible to correct convergence dynamically by energizing the respective electromagnetic components of the convergence magnet assembly with compensatory currents having parabolic waveforms. Usually these parabolic waveforms are derived from the horizontal and vertical deflection circuits and are applied simultaneously to each of the electromagnetic components.

Previously, in order to ascertain whether convergence, both static and dynamic, was perfect or as nearly so as possible, it was customary to use signal generators which produce signal waves which are applied so as to modulate the intensity of a selected one or ones of the several beams so that the latter produce luminous patterns on the screen comprising small rectangular or square areas known as "dots" (which shall hereinafter be referred to as "test dots" in order to distinguish them from the phosphor dots of the fluorescent screen). These "test dots" are either red, green or blue in color depending upon which beam produces them. Test dots of any one color are produced by turning on, during a number of successive line intervals, one of the beams for a short while at a specified time after the beginning of the scanning of each of the number of successive lines so that phosphor dots of only one color are traversed by the particular beam which is on.

If the test signals are applied to modulate all the beams simultaneously, each beam will produce a pattern of test dots in a different one of the three primary colors. If the beams are properly converged, the patterns of test dots produced by the several beams will seem to coincide with one another at all points on the raster to produce a single pattern of white test dots. Each white test dot is composed of one red, one green and one blue test dot all of which are substantially in register with one another. Stated in another way, each white test dot comprises a number of activated adjacent triads whose respective phosphor dots have been impinged upon by the divergent beams which have crossed over one another in the perforations respectively associated therewith.

If the beams do not cross over properly, then at one or more points on the raster the test dots of different colors produced by the respective beams will not coincide but will be either totally or partially separated from one or more of the others. Where they overlap one another, a color mixture area will be visible. Adjustments are thus required to bring the different colored test dots in to substantial register with one another so that they will merge into a single pattern of white dots. The adjustments necessary to correct convergence will necessarily depend on the nature of the trouble causing the misconvergence. It may be necessary in adjusting convergence of such tubes on the production line, for example, to adjust all the components of the convergence magnet assembly and the blue lateral positioning magnet before perfect cross over is achieved. In practice, this may entail high labor costs because as many as sixteen separate adjustments may be necessary.

Hitherto, when the convergence of the beams of an aperture mask tube was checked by using test dot patterns, it was necessary for the person testing the tube to be able to interpret the particular test dot pattern correctly before making the proper adjustments. If, for example, in the center of the raster a green colored test dot was to the left and a little below the corresponding red test dot, the blue dot being above and to the left of the red dot, the operator either had to know by experience, or had to find out by experiment, whether the red beam should be moved diagonally down, and if so how far down, or whether to move the green beam down in a different diagonal direction, and if so how far down, or whether to move both by a certain amount. When using test dots it is very difficult to tell, in adjusting the position of either the red or green beam by itself, when that beam is in its "correct convergence position," i.e., when it impinges on the proper phosphor dot of a given triad after having crossed over the other beams in the aperture associated therewith. Usually a trial-and-error method is employed which may necessitate a relatively long convergence adjustment period and higher labor costs as a result thereof.

The problem of adjusting the convergence of the beams of such tubes also arises when a new set is to be installed in the home of the ultimate consumer. If conventional test dot patterns are used, the ambiguities and uncertainties inherent in their use unnecessarily prolong the time required to adjust the beam convergence since the serviceman must constantly experiment, adjust and readjust until the sixteen possible convergence adjustments have been made so that an optimum convergence condition exists. Similar considerations of time and trouble arise in connection with the replacement of one aperture mask tube by another in the receiver of a customer, or in connection with convergence adjustments made necessary by the effects of the earth's magnetic field when the color television receiver is moved into a different position.

It is, accordingly, an object of the present invention to provide methods and apparatus for adjusting the relative position of the several beams of a plural-beam cathode ray tube of the type aforementioned.

Another aim of the invention is to provide methods and apparatus for adjusting the positions of the several beams of cathode ray tubes of the aperture mask type so as to obtain polychromatic images having good color fidelity and untinted monochromatic images.

Still another object of the present invention is to provide methods and systems for expediting the production of color television receivers using tubes of the type described herein.

Another object of the invention is to provide methods and apparatus for expediting the adjustment of convergence controls incident to the installation for consumer use of color television receivers using cathode ray tubes of the type described.

Still another object of the invntion is to provide apparatus which produces non-ambiguous test patterns for adjusting the convergence controls of color television receivers using cathode ray tubes of the type described.

The method according to my invention of adjusting the respective positions of the beams of cathode ray tubes of the type described is based on the fact that if first and second ones of said beams are caused to produce substantially the same test patterns, comprising configurations which include portions having axes parallel to the direction in which the first beam can be moved by the beam-moving means associated therewith, adjustment of the beam-moving means associated with said second beam can be made which will bring the configuration of the test pattern of the second beam into a desired spatial relation to that of the first beam, which thereupon indicates that the second beam is in its correct convergence position. Similarly, in order to adjust the position of the first beam, the test patterns produced by the two beams must have portions whose axes are parallel to the direction in which the second beam can be moved; adjustment of the beam-moving means associated with the first beam can then be made until the latter is in its correct convergence position.

Accordingly, in one form of my invention as applied to obtain the correct convergence of the three beams of an aperture mask tube having a plurality of beam-moving means associated therewith as hereinbefore described, my invention comprises the steps of applying signals to modulate two of said beams so that said beams produce substantially the same pattern of configurations shaped substantially like V's or inverted V's, the legs of the V's being respectively parallel to the directions in which the respective beams can be moved by the beam-moving means associated therewith, adjusting the beam-moving means associated with a first of said two beams until at least a portion of one of the legs of each of the V's produced by said first beam coincides with a portion of the corresponding leg of one of the V's produced by a second of said beams adjusting the beam-moving means associated with the second of said two beams until the V's produced thereby coincide with V's produced by said first beam, applying the same signals to modulate the third beam, and adjusting the beam-moving means associated therewith until the V's produced by said third beam coincide with V's produced by said first and second beams.

In this form of the invention, the signals applied to modulate the respective beams may be derived in a number of ways. The inverted V-shaped configurations may be printed on the target of a monoscope, for example, or the desired test pattern may be televised from a placard, or may be made into a film transparency and scanned by a flying spot scanner. While these methods are suitable for use in factory production, they involve apparatus which is inconvenient for use in home installation and servicing. For such purposes it is desirable to provide equipment which is simpler and more readily portable. I have therefore devised another form of the invention especially useful for field or service use. In this form, signals are applied so as to modulate two of the beams of aperture mask tubes so that they produce substantially identical test patterns comprising a plurality of lines or rectilinear figures which are disposed parallel to the direction in which the first of said two beams can be moved. The beam-moving apparatus associated with the second of said beams is adjusted until the two test patterns are superimposed, which indicates that the second beam is in its correct convergence position. Then different signals are applied to modulate these two beams so as to produce substantially identical test patterns comprising a plurality of lines or rectilinear figures which are disposed parallel to the direction in which the second of said two beams can be moved. Adjustment is then made to the beam-moving apparatus associated with the first of said beams until the test patterns of both beams are in register, a condition which indicates that the first beam is in its correct convergence position. Two of the beams having been adjusted to their proper convergence positions, the third beam, which may be moved in either of two directions which are transverse to one another, is then adjusted to its proper convergence position in the following way: All three beams are modulated by signals such that each produces a test pattern comprising a number of lines or rectilinear figures which are parallel to one of the directions in which the third beam may be moved. Since the first and second beams have already been adjusted to their proper convergence positions they will produce respective patterns which are superimposed. Therefore, if the pattern produced by the third beam is shifted in a direction transverse to the lines of the test patterns, the pattern of the third beam may be made to coincide with the registered patterns of the first and second beams. This condition indicates that the third beam has been adjusted in proper position insofar as one of its degrees of freedom is concerned. The final step in completing the convergence adjustment is to apply signals to modulate all three beams such that they produce substantially identical test patterns comprising lines or rectilinear figures parallel to the other direction in which the third beam may be moved. Since the first two beams have already been converged properly, their test patterns will coincide. By adjusting the beam-moving means associated with the third beam until the test pattern of the latter is superimposed on the registered patterns of the first and second beams, the convergence of the three beams is completed. Although this form of the invention requires that more than one set of signals be available, the test patterns produced in response thereto are very simple and signals for producing them are easily obtained with relatively uncomplicated apparatus.

Figure 1*a* is a schematic representation of a cathode ray tube of the aperture mask type showing various conditions of convergence of the several beams thereof;

Figures 1*b* and 1*c* are fragmentary perspective views of the aperture mask and the screen of an aperture mask tube which illustrates correct and incorrect convergence of the several beams thereof;

Figure 2*a* is a combined circuit, schematic and block diagram showing the circuits associated with the permanent and electromagnetic components of a typical convergence magnet assembly for an aperture mask tube;

Figure 2*b* is an enlarged and perspective view of one of the permanent magnets of the convergence magnet assembly shown in Figure 2*a*;

Figure 7E:
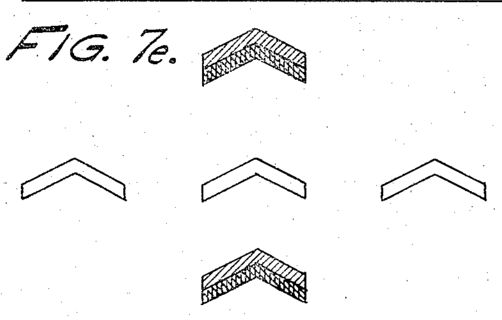
Figure 7I:
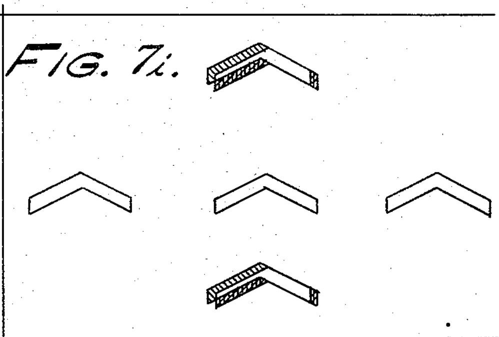
Figure 7F:
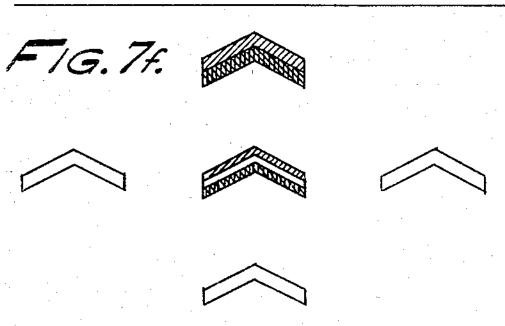
Figure 7J:
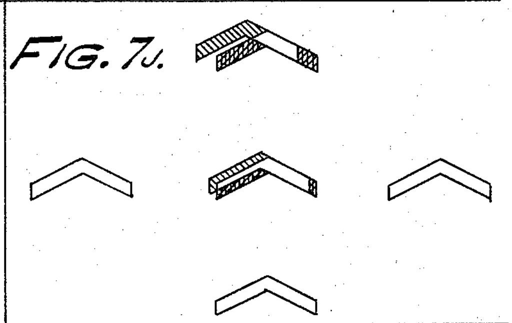
Figure 7G:
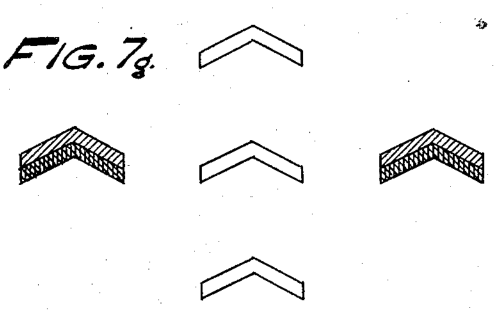
Figure 7K:
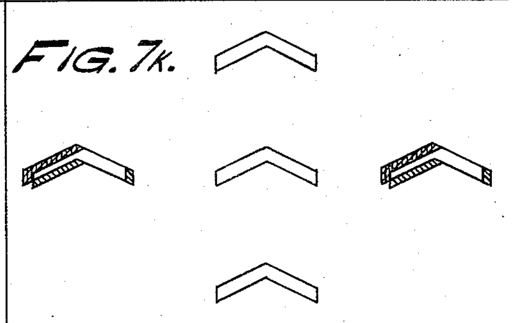
Figure 7H:
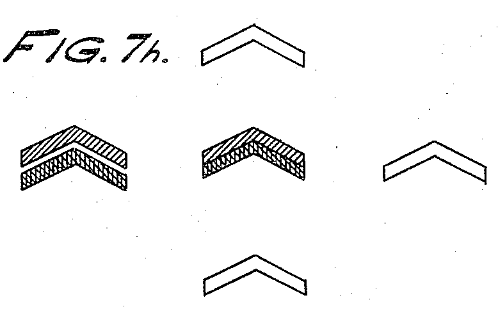
Figure 7L:
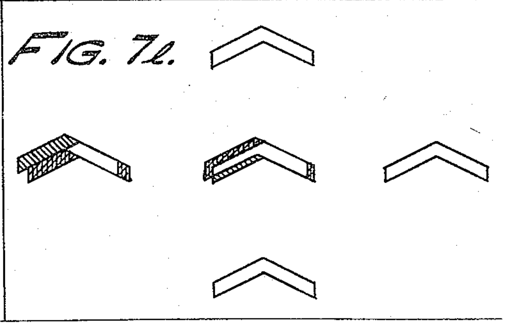

Figures 5*a*, 5*b*, 5*c*, 5*d*, and 5*e* show test patterns generated in one form of my invention which have certain desired characteristics which are used to converge the beams of aparture mask type tubes;

Figure 6 is a schematic diagram of another test pattern constructed in accordance with one form of the invention;

Figures 7*a* through 7*p* depict a number of possible conditions of displacements of test patterns generated according to my invention which indicate various forms of beam misconvergence.

Figure 9A:
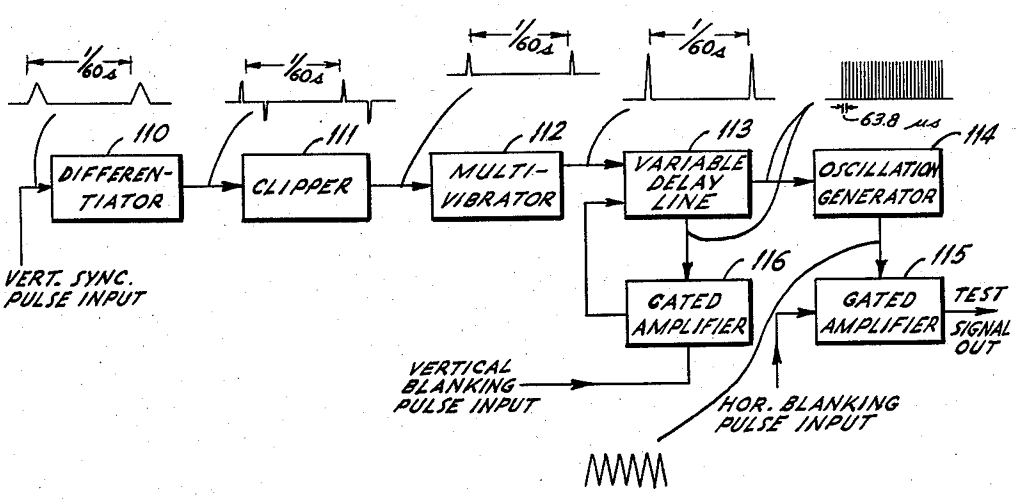
Figure 9B:
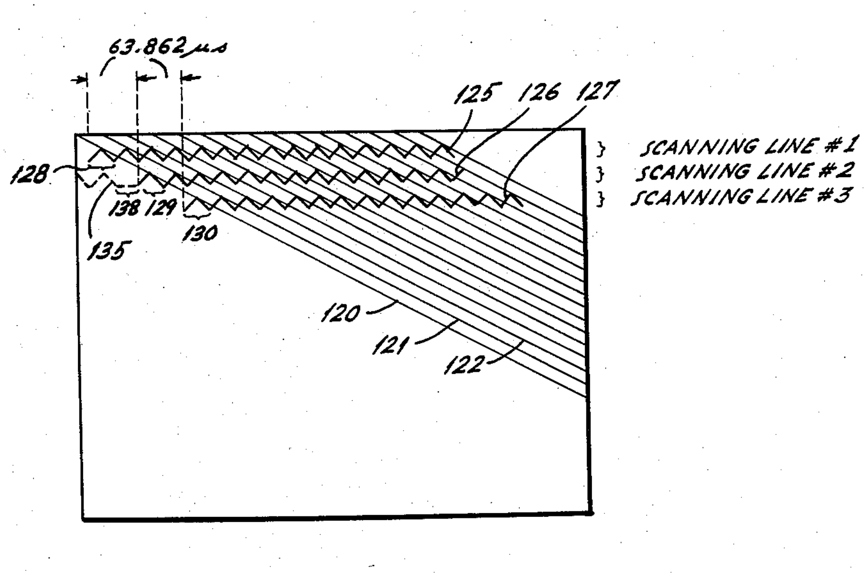

Figures 8*a*, 8*b*, 8*c*, and 8*d* show test patterns produced in accordance with another form of the invention;

Figure 9*a* is a block diagram of apparatus for generating test signals for producing the patterns shown in Figs. 8a–8d; and Figure 9b is a composite schematic representation of the scanning pattern of an aperture mask tube produced in response to test signals generated by the apparatus shown in Fig. 9a.

Figures 1A, 1B, 1C:
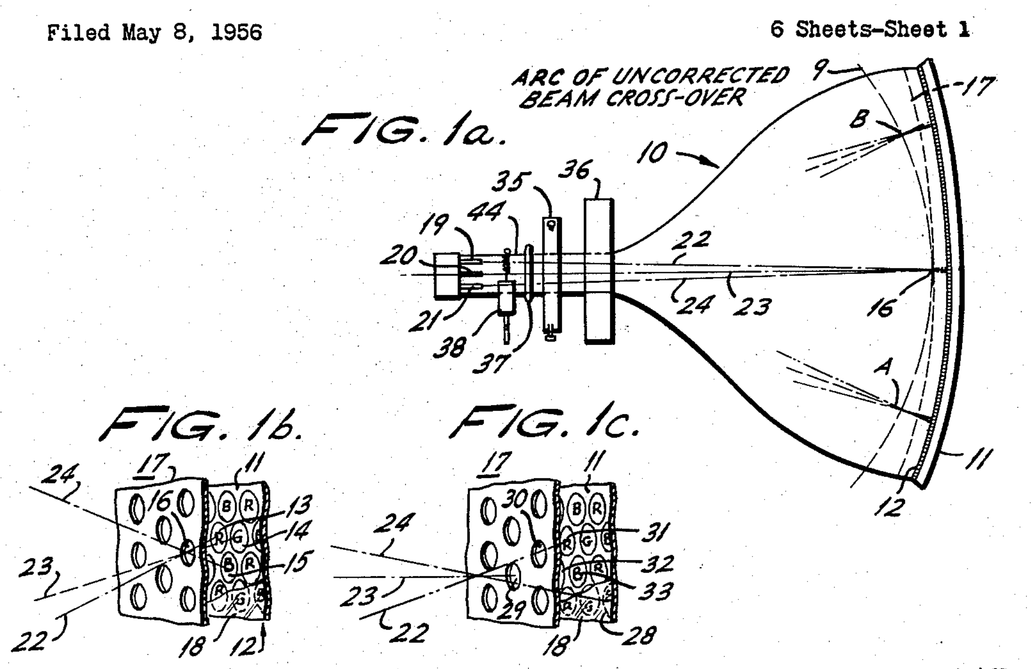

Referring to Figure 1, a shadow mask tube 10 is shown together with some of the conventional components associated therewith. The tube 10 consists of a faceplate 11 on which a screen 12 of fluorescent phosphors is disposed. The "aperture mask" 17 is a perforated sheet of metal whose curvature corresponds generally to that of the faceplate 11 and is disposed intermediate the screen 12 and the electron guns indicated schematically at numerals 19, 20 and 21. The screen 12 is shown in enlarged form in Figs. 1b and 1c and comprises a plurality of sets of phosphor dots, the dots of each set being emissive of light of one of the three additive primary colors red, green and blue when impinged upon by an electron beam. The dots are arranged as shown in Figure 1b, red dot 13, green dot 14 and blue dot 15 being displaced equally from one another and arranged in a group known as a "triad" which is aligned with aperture 16 of the mask. All other phosphor dots of the screen 12 are similarly arranged in triads, each of which is aligned with one of the apertures of the aperture mask 17. If desired, a reflective coating 18 of a metal such as aluminum may be deposited upon the rear surfaces of the phosphors as indicated. This layer 18 increases the brightness of the image reproduced by the tube and also assists in preventing the discoloration of the phosphor screen known commonly as "ion spot."

The electrons guns indicated schematically by the numerals 19, 20 and 21 generate the red beam 22, the green beam 23 and the blue beam 24 respectively. At the center of the faceplate 11 of the tube 10 the red, green, and blue beams may be made to cross over in the aperture 16 as shown in Figs. 1a and 1b. After crossing over in aperture 16 the beams will diverge slightly and impinge upon the corresponding red, green and blue phosphor dots 13, 14 and 15 which constitute one triad. When the beams are deflected from the left side to the right side of the screen, however, the beams 22, 23 and 24 will not cross over in apertures of the aperture mask 17 but rather at the points in their scanning path indicated by the letters "A" and "B," for example, provided that no dynamic correction of the points of cross over has been made. All cross over points of the three beams when scanning off center will fall on the indicated "arc of uncorrected beam cross over" 9. After crossing over at some point on arc 9 away from the center of the screen the beams will diverge slightly and pass through one or more of the apertures before striking the screen 12. It may be seen that when the beams finally do strike the screen 12 they are more widely spaced than they would have been had they crossed over in one of the apertures of the aperture mask 17.

The effects of uncorrected beam convergence are shown in the greatly simplified case illustrated in Figure 1c. It is seen that the beams cross over between the aperture mask 17 and the electron guns rather than in one of the apertures of the mask itself. As a result, beams 23 and 24 pass through the aperture 29, whereas the beam 22 passes through the aperture 30. Thus the beams do not impinge on the phosphor dots 31, 32 and 33 of a single triad, but rather the green beam 23 strikes the green emissive phosphor dot 32 and the red beam 22 strikes the red emissive phosphor dot 31 in one triad, while the blue beam 24 strikes the blue emissive phosphor dot 28 which belongs to a triad other than the one containing the red and green phosphor dots 31 and 32. Thus the red and green beams are in their correct convergence positions whereas the blue beam is not. Consequently in relatively small detail areas it will be observed that the edges of objects will have "fringes" of the wrong color due to the fact that the blue beam 24 is not in its correct convergence position, since it does not fall on blue phosphor dots 33 which belong to the same triad as the red and green emissive phospher dots 31 and 32.

In order to adjust the positions of the beams 22, 23 and 24 so that they will cross over in apertures of the aperture mask 17, a convergence magnet assembly 35 is shown in Fig. 1a interposed between a conventional color television deflection yoke 36 and a conventional so-called "purity magnet" 37. This is usually a permanent magnet similar to centering magnets used on conventional black and white receivers, and its field affects all three beams equally. The field of this magnet is adjusted for strength and direction such that all the beams pass through their centers of deflection.

The convergence magnet assembly 35 is susceptible of a number of adjustments for moving the positions of the red, green and blue beams in directions which are 120° apart for both static (center of raster) convergence and dynamic (all points on the raster) convergence. One of the beams, usually the blue beam, may also be moved in a direction transverse to the direction in which it can be moved by adjustment of assembly 35, by adjusting the position of the blue beam lateral positioning magnet 38 which is interposed between the purity magnet 37 and the electron guns 19, 20 and 21.

Figure 2A:
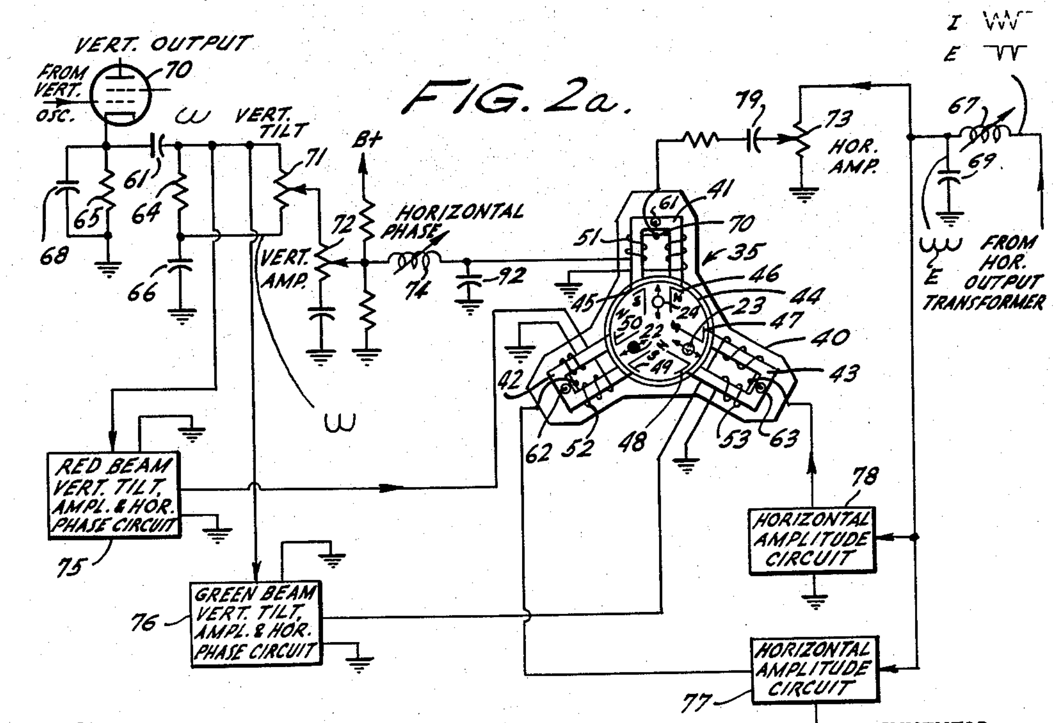

The convergence magnet assembly 35 is shown in schematic form in Figure 2a together with representative circuits associated therewith which supply the necessary corrective waveforms thereto for achieving substantially perfect dynamic convergence. Within a mounting member 40 are positioned a number of magnetic cores 41, 42 and 43 around which coils 51, 52 and 53 respectively are wound. The poles of the electromagnets formed by the cores and their associated coils are placed in contact with the neck 44 of the tube 10. In proximity to each of the poles of the electromagnets formed by the coils and the cores are the internal pole pieces 45, 46 and 47, 48, 49, and 50 which assist in directing the fields produced by the electromagnets onto particular ones of the electron beams produced by the electron guns. For example, pole pieces 45 and 46 direct the magnetic flux emanating from the core 41-coil 51 combination so that it affects the blue beam 24 which is shown as an unfilled circle. The other beams indicated by the black circular area 22 and the stippled area 23 respectively are likewise affected by the fields produced by the electromagnets associated therewith. The respective directions in which the beams 22, 23 and 24 may be moved by adjustment of assembly 35 are indicated by the arrows passing through the respective circular areas representative thereof.

Each of the core-coil combinations is adapted to be energized by currents having appropriate waveforms so that the beams 22, 23 and 24 are moved up or down as required as they are deflected so that they will cross over in the apertures of the aperture mask 17 for proper dynamic convergence.

Figure 2B:
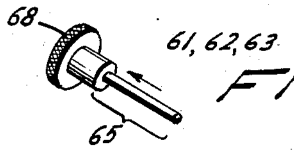

Also associated with each of the cores 41, 42 and 43 are the permanent magnets 61, 62 and 63 which are disposed in apertures within the respective cores. A typical one of these permanent magnets is shown in enlarged, perspective form in Figure 2b. It consists of an active magnetic portion 65 which comprises a north pole in the form of a half cylinder (indicated by the white portion of the active section 65) in contact with an oppositely magnetized pole also in the form of a half cylinder (indicated by the black portion of the section 65).

To effect changes in the static convergence positions of the three beams, the permanent magnets 61, 62 and 63 may be rotated manually by means of the knurled end portions 68. The magnetic fluxes of the magnets 61, 62, and 63 are guided by the corresponding cores 41, 42, and 43, and by the internal pole pieces 45—50 so as to move the beams in the directions indicated. As stated before, the blue beam 24 may be moved by the lateral positioning magnet 38 and its associated pole pieces (not shown) in a direction transverse to that indicated by the arrow passing through it in Fig. 2*a*.

Previously it was remarked that, in order to obtain dynamic convergence of the three beams in the apertures of the aperture mask 17, corrective waveforms were applied to the coil-core combinations in the convergence magnet assembly 35. It was also stated previously that the corrective currents through the coils 51, 52, and 53 should have parabolic waveforms to correct for the parabolic curve of error in the vertical direction and for the parabolic curve of error in the horizontal direction.

Figure 3:
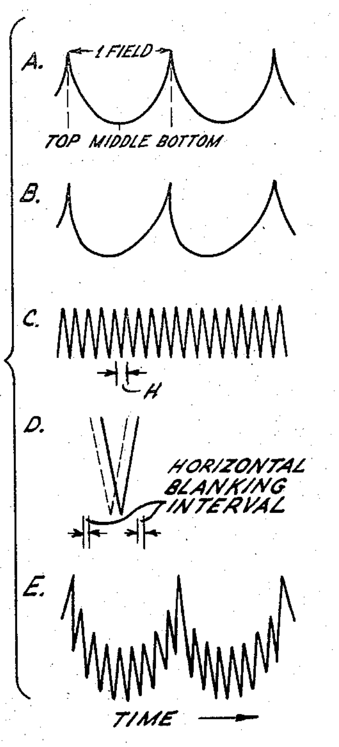
Figure 3 shows waveforms of signals used to energize the components of the convergence magnet assembly shown in Fig. 2*a*.

In Figure 3 a typical parabolic waveform A of a current is shown which can be applied to the coils of assembly 35 to compensate for the error in the vertical direction. Portions of this parabolic wave corresponding to the top, middle and bottom of a raster are so indicated. It will be seen by reference to Figure 1*a* that, at the top and bottom of the screen, the beams must be made to cross over at points farther from the electron guns than the point at which they cross over at the center of the screen. Thus, during the scanning of lines toward the top and toward the bottom of the raster, the beams are made to diverge more in the region of the convergence magnet assembly, than when the beams scan the central lines of the raster. Consequently, if corrective currents having waveform A are applied to the core-coil combinations of the assembly 35, electromagnets having their poles as shown in Fig. 2*a* will produce magnetic fields which will cause the beams to move away from one another during intervals corresponding to the scanning of the upper and lower lines of the raster, and will cause the beams to move toward one another during intervals corresponding to the scanning of the central lines thereof.

The manner in which the parabolic waveform required to correct convergence dynamically in the vertical direction is obtained in the circuit shown in Fig. 2*a* will be explained in detail in connection with the blue beam 24. In the typical circuit shown in Fig. 2*a* a waveform which is parabolic but tilted to the right is obtained at the cathode of the vertical output tube 70. This tilted waveform results from the partial integration by the circuit including the resistance of tube 70, resistor 65 and condenser 68 of the saw-tooth supplied to the grid of the tube 70. Another integrating circuit comprising resistor 64 and condensers 61 and 66 in series, and potentiometer 71 produces the fully integrated waveform shown at the junction of potentiometer 71 and condenser 66. Movement of the tap on potentiometer 71 changes the amount of resistance in series with the capacitors 66 and 61 thus determining the amount of integration of the unsymmetrical parabola on the cathode of tube 70. When the tap is at the top of the resistive element a parabola having the greatest possible tilt toward the right is obtained as shown in waveform B (Fig. 3); when the tap is at the bottom of the element a practically symmetrical parabola is obtained. Waveforms having shapes intermediate these two extremes may be obtained by corresponding adjustment of the tap of potentiometer 71. The amplitude of the vertical parabola applied to the coil 51 is determined by the setting of the movable arm on the potentiometer 72 so that the desired amount of the vertical parabola is applied by the variable inductance 74 to the coil 51 associated with the core 41. Not specifically shown, but indicated by blocks 75 and 76, are essentially similar circuits for applying the vertical corrective waveform from the appropriate sections of the circuits 75 and 76 to the red and green beam-moving means comprising the cores 42 and 43 with their respective coils 52 and 53.

In order to correct the convergence of the three beams to account for the errors in the points of convergence which occur during the scanning of each line from the left to the right side of the screen, corrective currents are also applied to the convergence magnet assembly 35, but the latter currents have a much higher frequency, i.e., the horizontal line scanning frequency, as shown in waveform C. These corrective waveforms also cause the beams to diverge more (in the region of the magnet assembly 35) when the left and right sides of the raster are scanned than when the central portions are scanned. Consequently, toward the left and right sides of the screen the beams will be made to cross over approximately in the apertures of the aperture mask 17 rather than at points intermediate it and the electron guns as shown in Fig. 1*a*.

In the specific circuit shown for adjusting the position of the blue beam 24 negative pulses from the horizontal output transformer are first integrated by the variable inductor 67 to produce a saw-tooth waveform (illustrated by the dashed line waveform in Fig. 2*a*) which is again integrated by the condenser 69 to produce a parabola as indicated which occurs at the horizontal line scanning frequency. The desired amplitude of the horizontal parabolic waveform is obtained by adjusting the tap on potentiometer 73. The parabolic waveform thus obtained is applied to a series resonant circuit which includes the capacitor 79 and the inductance of the coil 51 as it appears looking into the coil at the center tap 70. This series resonant circuit is resonant to the horizontal line scanning frequency and provides a channel by which the horizontal parabolic corrective signal is applied with voltage and current in phase to energize the coil 51. However, in the circuit shown, the parabolic corrective signal is not used to effect the horizontal convergence. Instead, a sine wave at the horizontal line scanning frequency is generated by a resonant circuit comprising the coil 51 in parallel with the condenser 92. The waveform of the sine wave generated by this parallel resonant circuit is approximately the same as the desired parabolic waveform and can conveniently be used to energize the convergence coils. If it is desired to apply a larger corrective current on the left side of the raster than on the right, it is necessary to unbalance the corrective waveform with respect to the center of the scanning line. A simple method is to change the phase of the corrective sine wave with respect to the timing of the horizontal blanking intervals as shown in waveform D of Fig. 3 which is an enlarged view of one cycle of the waveform C. It will be noted that the dashed line cycle has been advanced in phase so that during the actual image scanning period there is a lesser corrective current applied at the beginning than at the end of the scanning line. A simple way of changing the phase of the corrective sine wave is to detune the natural frequency of the parallel resonant circuit (coil 51—condenser 92). This may be accomplished by adjusting the horizontal phase variable inductance 74 which is effectively in parallel with the inductance of the coils 51. When this is done the parallel resonant circuit 51—92 has a natural frequency which is different from the driving frequency, i.e., the frequency of the parabolic waveform applied from the series resonant circuit to the parallel resonant circuit. This will produce the desired shift in phase with the result that the minimum corrective current is no longer spaced approximately equally between the end of the previous horizontal blanking period and the beginning of the next horizontal blanking, but is shifted either to the left (as shown in waveform D) or to the right thereof. The vertical corrective parabolic current wave and the horizontal sine wave (waveform C) are combined in coil 51 to produce a composite wave which is shown in waveform E of Figure 3. This composite wave causes the position of the beam 24 to be shifted gradually from the top of the raster to the bottom, and also causes it to be shifted during the course of each scanning line.

As shown in Figure 2*a* there are similar circuits 75, 76, 77 and 78 connected with the coils 52 and 53 for affecting the positions of the beams 22 and 23 respectively. Thus there are sixteen possible adjustments that can be made (i.e., four adjustments for static convergence, and twelve for dynamic convergence) before all the beams are properly converged. When test dot patterns are used in making convergence adjustments it is very difficult to interpret them in such a way that one can, by adjusting the position of only one of the beams, determine when the adjusted beam is in its correct position for proper beam convergence without adjusting the position of any other beam.

Figure 5A:
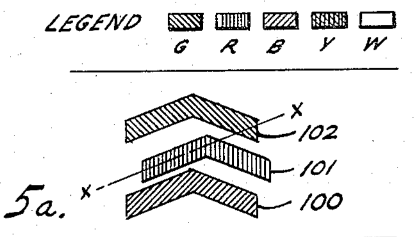
Figure 5B:
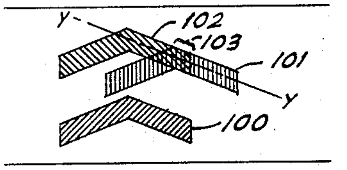
Figure 4:
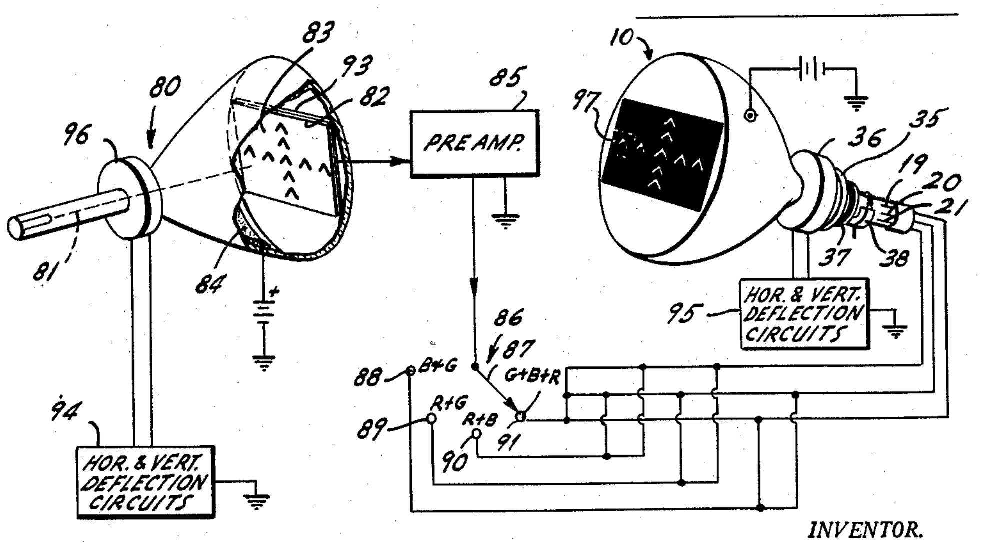
Figure 4 is a schematic and block diagram of a system for converging the beams of an aperture mask type of cathode ray tube.

I have found that if test patterns such as shown in Figures 5*a*–5*e* are produced by the several beams, the adjustment of the convergence of the beams is greatly simplified and one can tell, by adjusting the position of only one beam, when that beam is in its correct convergence position. To this end, I provide apparatus, in the form of the invention shown in Figure 4, for generating signals which, when applied to the respective electron guns of an aperture mask tube, result in the production of test patterns of the sort shown in Fig. 5. As shown in Fig. 4, these signals may be generated by a conventional monoscope 80 having an electron beam 81 which is scanned over a target 82 in response to deflection signals supplied to yoke 96 from circuits 94. On target 82 there appears one or more inverted V-shaped configurations printed in carbon ink on the metallic surface 83 which is composed of aluminum with an oxide coating. The surface 83 is deposited on a backplate 93. When the beam 81 scans the target 82, the number of secondary electrons emitted from the metallic surface 83 differs from the number of secondary electrons emitted from the impinged-upon carbon pattern. The emitted secondary electrons are collected by the anode 84. The differences in emitted secondary electrons give rise to a modulated secondary emission current on the back plate of the target which is amplified in the preamplifier 85. The amplified secondary emission current may then be applied by appropriate adjustment of the arm 87 of switch 86 to one or more of the electron guns (not shown) of tube 10. Thus if arm 87 is turned to contact 91, the monoscope signal will be supplied to all three of the electron guns. If the beams from the three guns are properly converged, a pattern of white inverted V's will appear on the face of tube 10, as shown, produced by the scanning of the screen by the three beams in response to signals applied to yoke 36 from circuits 95. This pattern corresponds substantially to the pattern on the monoscope targets. If, however, the beams are not properly converged, displaced patterns will be produced in the three primary colors emitted by the different colored phosphors of which the screen of the tube 10 is composed. For example, the portion of the pattern on the face of tube 10 shown in box 97 may appear as shown in Fig. 5*a* where the colors of the separate V-shaped configurations are as indicated by the key. The red configuration 101 is above and to the right of the blue configuration 100, whereas the green configuration 102 is above both the red and blue configurations, being directly above the blue configuration 100. The broken line X—X drawn through one of the legs of the configuration 101 indicates the direction in which the latter may be moved by adjusting the permanent magnet 62 of the convergence magnet assembly 35. The first step in registering the three configurations 100, 101, and 102 is to move the magnet 62 by turning the knurled end thereof until a portion of the right leg of red configuration 101 is superimposed upon a portion of the right leg of the green configuration 102 as shown in Fig. 5*b*. The portion where the red and green configurations overlap are indicated at the numeral 103 in Fig. 5*b* will therefore be yellow, indicating that the red beam 22 has been adjusted to its proper static convergence position.

Figure 5C:
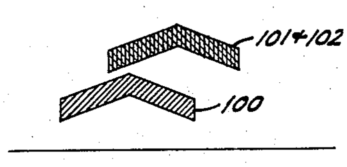
Figure 5D:
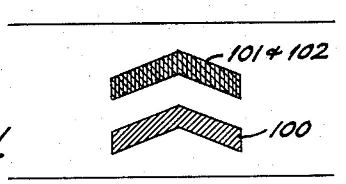

The next step in aligning the beams for static convergence is to move the green beam by adjusting the position of the permanent magnet 63 until the green configuration 102 moves down along the axis Y—Y and becomes superimposed on the red configuration 101 as shown in Fig. 5*c*. The superimposed configurations 101 and 102 which will be yellow colored, must then be aligned with the configuration 100 to complete the convergence adjustment. Configuration 100 is produced by the blue beam 24 which, it will be recalled, can be moved both horizontally and vertically. Accordingly, the blue configuration 100 is moved to the right until it is directly under the combined configurations 101 and 102 as shown in Figure 5*d*. This is accomplished by adjustment of the blue beam lateral positioning magnet 38. The final step is to adjust the permanent magnet 61 until the blue configuration 100 is caused to move up and become exactly superimposed upon the combined configurations 101 and 102, as shown in Fig. 5*e*, whereupon the composite inverted V-shaped configuration will be totally white indicating that all three of the beams have been correctly converged.

Figure 5E:
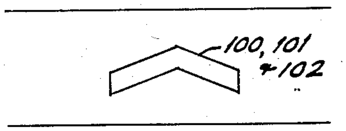

If desired, adjustment of the position of the blue beam to its correct convergence position can be accomplished in a way different from that illustrated in Figs. 5*d* and 5*e*. Instead of relying on visual inspection of the inverted V's for vertical and horizontal alignment thereof as was the case in the last two steps of the illustrated process, the blue beam may be correctly converged by applying to all three beams test patterns containing portions whose axes are parallel to the directions of possible movement of the blue beam, i.e., test patterns containing vertical and horizontal lines as shown in Fig. 6 which is a view of a monoscope target containing configurations according to my invention.

Fig. 6 includes a series of inverted V's along the horizontal axis, and a number of inverted V's placed along the vertical axis for horizontal and vertical dynamic convergence. Additional horizontal and vertical rows of configurations may be included for checking convergence at other points on the raster. In the test pattern illustrated there is included a supplemental pattern of dots located at the intersections of a series of equispaced vertical and horizontal lines extending over the entire target area. These dots are used to test the convergence on the raster at specified points other than those where inverted V's are to be found. If desired the test pattern may also be supplemented by the addition of a cross-hatch pattern of regularly spaced vertical and horizontal lines as shown which can be used to test linearity of the sweep circuits. Another check on linearity may optionally be provided by the addition of the circular designs as shown which are well known in conventional black and white test patterns.

Figures 7*a*–7*p* indicate how the inverted V-shaped configurations of the test pattern shown in Fig. 6 would appear if the beams are misconverged because of one or more improper adjustments. In Figs. 7*a*–7*p*, in order to simplify the illustration and explanation thereof, only the central top and bottom, extreme left and extreme right inverted V's of the test pattern shown on the face of tube 10 in Fig. 4 are shown. In the adjustment of the convergence of the beams of tube 10 by using this kind of test pattern it becomes possible to correct for any one or combination of the sixteen possible misadjustments of convergence in a minimum amount of time and without substantial experimentation, estimating, or interpretation. Below, in table form, the symptoms of sixteen possible causes of misconvergence of the beams producing the patterns of Figs. 7*a*–7*b* are listed together with a brief statement of the corresponding adjustment required to correct it.

STATIC CONVERGENCE TROUBLES

| Figure | Symptom Analysis | Required Adjustment |
|---|---|---|
| 7a | Blue beam too far right | Adjust blue beam lateral positioning magnet 38. |
| 7b | Blue beam too high | Adjust blue beam permanent magnet 61. |
| 7c | Red beam too high | Adjust red beam permanent magnet 62. |
| 7d | Green beam too high | Adjust green beam permanent magnet 63. |

DYNAMIC CONVERGENCE TROUBLES

| Figure | Symptom Analysis | Required Adjustment |
|---|---|---|
| 7e | Blue beam vertical parabola is symmetrical but needs more amplitude at top and bottom of raster. | Adjust potentiometer 72. |
| 7f | Blue beam vertical parabola is unsymmetrical. | Adjust vertical tilt 71. |
| 7g | Blue beam horizontal parabola is symmetrical but wrong amplitude at left and right sides of raster. | Adjust potentiometer 73. |
| 7h | Blue beam horizontal parabola is unsymmetrical. | Adjust variable inductance 74. |
| 7i | Green beam vertical parabola is symmetrical, but wrong amplitude at top and bottom of raster. | Adjust vertical amplitude portion of circuit 76. |
| 7j | Green beam vertical parabola is unsymmetrical. | Adjust vertical tilt portion of circuit 76. |
| 7k | Green beam horizontal parabola is symmetrical but has wrong amplitude at left and right sides of raster. | Adjust green beam horizontal amplitude circuit 78. |
| 7l | Green beam horizontal parabola is unsymmetrical. | Adjust horizontal phase portion of circuit 76. |
| 7m | Red beam vertical parabola is symmetrical but has wrong amplitude. | Adjust vertical amplitude section of circuit 75. |
| 7n | Red beam vertical parabola is unsymmetrical. | Adjust vertical tilt portion of circuit 75. |
| 7o | Red beam horizontal parabola is symmetrical but has wrong amplitude. | Adjust circuit 77. |
| 7p | Red beam horizontal parabola is unsymmetrical. | Adjust horizontal phase section of circuit 75. |

While, as hereinbefore mentioned, the apparatus shown in Fig. 4 for practicing my invention is entirely suitable for use in factory production of television receivers, it is somewhat cumbersome and therefore not readily adapted for field service use. I have found, however, that it is entirely feasible to produce suitable test patterns for use in accordance with my invention employing apparatus which is much simpler and more readily portable.

Figs. 8*a*, 8*b*, 8*c* and 8*d* illustrate test patterns of the type which can be generated by portable and relatively simple equipment. Such equipment is useful to service men in initially installing a color television set in the home of a consumer, in adjusting the convergence of a new aperture mask tube which replaces an old one, or in touching up the convergence of an aperture mask tube when it has been thrown out of adjustment because of the effects of the earth's magnetic field thereupon when the receiver has been moved to a new position.

The first step in converging the beams of a shadow mask tube using test patterns such as those illustrated in Figs. 8*a* and 8*b* is to apply to the red and green electron guns signals such as to produce the test patterns shown in Fig. 8*a*. The solid lines represent luminous lines of red and the dashed lines represent lines of green. The red lines are oriented so that they are parallel to the direction in which the red beam may be moved by the beam-moving means associated therewith. Since the red lines are thus disposed parallel to the direction in which they are movable, adjustment of the red beam-moving means cannot possibly cause the pattern of red lines to coincide with the green lines. Only by adjusting the means for moving the green beam can the superimposition of the red and green lines be achieved. Therefore, the means for moving the green beam is adjusted until there appears but one test pattern of yellow lines parallel to the direction in which the red beam may be moved. This yellow line test pattern then indicates that the green beam has been moved to its correct convergence position.

The next step is to apply a different set of signals to the red and green electron guns respectively so that the two sets of red and green lines shown in Figure 8*b* appear on the screen of the tube. These lines are inclined 120° with respect to the lines of Fig. 8*a* and both sets of lines are parallel to the direction in which the green beam may be moved. Adjustment of the position of the green beam cannot cause the two sets of lines to coincide. Therefore adjustment of the red beam position by the beam-moving means associated therewith is made until the two sets of lines coincide forming a single pattern of yellow lines, which indicates that the red beam is in its proper convergence position.

Having adjusted the red and green beams to their proper convergence positions it is only necessary to adjust the position of the blue beam in both directions in which it can move until it is in its proper convergence position. This is done by applying a third set of signals to all three of the guns so that two sets of horizontal lines are produced, one set being yellow because of the correct convergence of the red and green beams, and the other set being blue. By adjustment of the permanent magnet associated with the blue beam, the blue lines are moved in a vertical direction until the yellow and blue sets of horizontal lines coincide, whereupon one set of horizontal white lines is formed. This indicates that the blue beam is properly positioned insofar as its vertical component of movement is concerned.

The final step is shown in the test pattern of Fig. 8*d* which is obtained by applying to the red, blue and green guns signals which are such as to produce two sets of vertical lines, one yellow (the red and green beams being properly converged) and one blue. By adjusting the blue beam lateral positioning magnet, the blue lines are shifted laterally until they coincide with the yellow lines, whereupon one single set of white vertical lines is produced indicating that the lateral position of the blue beam is correct for proper beam convergence.

It is possible to produce test patterns such as shown in Figs. 8*a* and 8*b* by applying the output waves from a conventional bar generator which generates its own sync pulses to the video amplifier of a set to be tested. The horizontal "hold" control is then adjusted until it locks in with the incoming sync pulses at a frequency which differs from the standard horizontal frequency by about 60 cycles, i.e., the vertical deflection frequency. The pattern of slanted lines, thus produced will not have exactly the right angle of tilt, but will be sufficiently accurate to permit many useful convergence adjustments to be made. To obtain test pattern lines having the right amount of tilt the difference in frequency between the incoming sync pulses and the frequency at which the "hold" control is adjusted should be 80 cycles (4/3 of the vertical frequency). Since most hold controls would not have a sufficiently large range to enable it to be set to a frequency at which this frequency would be obtainable, it may be necessary to provide for a sync frequency in the bar generator. The bar generator should also be such as to produce signals which result in the production of twelve bars. With this arrangement twelve slanted lines which are constant in position and have the desired angle will be generated.

Another way of producing the test patterns shown in Figs. 8*a* and 8*b* by the use of simple apparatus, one form of which is illustrated in Figure 9*a*. Vertical synchronizing pulses from an appropriate point in the color television receiver, or from some external source, are differentiated in the differentiator 110 which may be of conventional construction. The output signal of the differentiator 110 has a waveform consisting of positive and negative pulses (or "spikes") of extremely narrow widths corresponding to the leading and trailing edges of the vertical sync pulses. The spikes of one polarity, say the positive spikes, are clipped from the output signal of differentiator 110 by the clipper 111, which may be of conventional construction, and applied to trigger a so-called "one shot" multivibrator 112. The multivibrator 112 may be of conventional construction and produces an output signal comprising a train of high amplitude, narrow width pulses having a duration of the order of one microsecond, for example, which are separated from one another by 1/60 of a second. These pulses are applied to one input of a variable delay line 113 which may be adjustable to produce delays from, say 55 to 70 microseconds. The pulses applied to delay line 113 from the multivibrator 112 are accordingly delayed depending upon the adjustment of the delay line 113. It may be shown that, if the applied pulses are delayed by 63.862 microseconds (63.5 microseconds(H)+0.362 microseconds), diagonal lines such as shown in Fig. 8*a* will be produced on the screen of the tube. When one pulse from multivibrator 112 is applied to delay line 113, it is delayed and fed back via the gated amplifier 116 to the input of line 113 where it is again delayed 63.862 microseconds and again fed back. This gives rise to a train of numerous narrow pulses in the output circuit of line 113, the pulses being separated from one another by the amount of delay introduced. The amplifier 116 is normally gated on except when a vertical blanking pulse from an appropriate source is applied thereto. The delayed pulses are therefore fed back to delay line 113 except during the vertical blanking interval, the gain of the amplifier being sufficient to restore the energy dissipated in the feedback loop.

The delayed pulses are supplied to synchronize the oscillation generator 114 which produces a sine wave output signal having a frequency of, say 1 megacycle. The generator 114 may be a ringing circuit of conventional design such as the one-stage circuit shown in Fig. 37, pages 2–70 of "Principles of Radar," (McGraw-Hill Book Company, Second Edition, 1946). This circuit comprises a triode amplifier having an LC circuit connected intermediate its cathode and ground. When the delayed pulses are applied to the control grid, the trailing edges thereof cause the tube to stop conducting and the current of the inductor of the LC circuit flows into the capacitor thereof thus starting a ringing oscillation at the frequency to which the LC circuit is naturally resonant. The oscillations produced will continue until the losses of the LC circuit cause it to be damped out. The time in which the oscillations are damped out is related to the "Q" of the circuit. With a high enough value of Q, successive cycles of the ringing oscillations produced by the LC circuit action may be relatively constant in amplitude over a period of one line's duration. If desired, some limiting of the oscillations may be introduced in order to keep the amplitude of successive cycles even more uniform. Since the delayed pulses applied to the generator 114 occur every 63.862 microseconds, i.e., at intervals slightly larger than the duration of a single scanning line, a new series of ringing oscillations will be initiated once each line.

The oscillations thus produced are applied to the circuit under test, i.e., to the desired electron guns of the aperture mask tube, by way of the gated amplifier 115 which is conductive except during the horizontal blanking interval. The positive peaks of these oscillations, which are shown by the waveforms 125, 126 and 127 in Fig. 9*b*, cause the beams to be turned on a number of times during each line which produces, after the scanning of several lines, a number of parallel diagonal luminous lines 120, 121, 122, etc. The first cycle 129, of the train of oscillations 126 caused in response to the application of the second pulse from delay line 113 to generator 114, begins exactly 63.862 microseconds later than the first cycle 128 of the train of oscillations 125 produced in response to the first pulse applied to generator 114 during scanning line number 1. Similarly, the first cycle 130 of oscillation 127 occurs exactly 63.862 microseconds later than the first cycle 129.

Thus, because of the action of the delayed pulses in triggering the beginning of the first cycle of a new train of ringing oscillations once during each scanning line, the corresponding succeeding cycles of successive trains bear a uniform and constant phase relation to one another which helps to assure the production of test lines 120, 121, etc. having the desired inclination.

It should be noted that, before the initial cycle 129 of the train of oscillations 126 is initiated during the second scanning line, cycles 135 of oscillations (shown in a broken line waveform) occur which are the last cycles of the preceding train of oscillations 125 generated during scanning line #1. There will thus be a transitional period, indicated by the numerals 138, during which the phase of the oscillations shifts from that of the previous line to that of the next line.

If diagonal lines are desired, as shown in Fig. 8*b*, which are at an angle of 120° with respect to lines 120, the delay line 113 is adjusted to introduce a delay of 63.138 microseconds, i.e., 63.5 microseconds (the duration of one horizontal scanning line) minus 0.362 microsecond.

The oscillations are not applied to the test circuit during the horizontal blanking period because they might produce a visible pattern if they were. To this end, when the horizontal blanking pulses are applied to amplifier 115, the latter is cut off so that no ringing oscillations appear in its output during the retrace interval.

It should be noted that the space and time scales of Figure 9*b* have been considerably exaggerated for illustration purposes. Actually, the first cycles 128, 129, and 130 of scanning lines number 2 and number 3 will occur much closed to the left side of the screen than shown. Also the number of cycles in the trains of oscillations 125, 126 and 127 has been considerably reduced.

In order to produce the test patterns shown in Figures 8*c* and 8*d* recourse may be had to conventional circuits for generating pulses which, when used to modulate on electron beam, produce the requisite horizontal and vertical lines. These circuits are well known and are used to test the deflection linearity of monochrome or color television receivers. It is therefore considered unnecessary to include a description of possible ways to produce such test patterns.

It should be appreciated that test patterns such as those shown in Figures 8*a*–8*d* can also be produced by using more complicated apparatus such as shown in Figure 4, or by using a flying spot scanner, or a televised placard on which the desired lines appear. On the other hand, the patterns shown in Figure 6 may be generated without the use of a pickup tube or its equivalent by appropriate circuits for generating pulses or other signals that will result in desired test patterns when used to modulate the electron beams.

It should also be appreciated that, after the red and green beams have been moved into their proper convergence positions by the use of inverted V-shaped configurations, as explained in connection with Figures 4 and 5, it is not necessary that the signals applied to the blue beam for the adjustment of the position thereof be such as will also produce inverted V-shaped configurations. Since the red and green beams are in their proper convergence position it is only necessary to adjust the blue beam laterally and vertically. This may be accomplished, for example, by applying signals to all three electron guns which will produce vertical and horizontal lines as shown in Figs. 8*c* and 8*d*.

Similarly, when the red and green beams have been properly adjusted by using line test patterns such as shown in Figs. 8*a* and 8*b*, inverted V-shaped test patterns may be used to adjust the position of the blue beam. To this end, appropriate signals may be applied to all three guns and the blue configurations may be shifted horizontally or vertically, by adjustment of the beam-moving means associated with the blue beam, until they coincide with the yellow inverted V-shaped configurations produced by the properly converged red and green beams.

It is also true that the inverted V-shaped configurations or V-shaped configurations need not actually have two legs which intersect one another. So long as the lines are displaced 120° (or the number of degrees corresponding to the displacement of two electron guns of a multi-beam cathode ray tube) the two beams can easily be adjusted to the proper convergence position.

While the invention has been described with particular reference to its use in color television image reproducing tubes of the aperture mask type, it may be used in adjusting the areas of impingement of other types of cathode ray tubes in which it is desired that several beams converge on the screen. Also, in other applications, as in so-called "dark trace" cathode ray tubes having a plurality of beams, the test patterns will be dark traces rather than luminous ones.

It will be understood that still other embodiments and applications of the invention described herein will occur to those skilled in the art. Consequently, I desire the scope of this invention to be limited only by the appended claims.

What I claim is:

1. A method of adjusting the relative positions of the areas of impingement of a plurality of electron beams on the screen of a cathode ray tube in which a plurality of electron beams are produced, said tube having associated therewith means for deflecting said beams in a predetermined scanning pattern over said screen and a plurality of adjustable means for moving corresponding ones of said beams in respective predetermined directions, said method comprising the steps of: modulating said beams so that they produce respective test patterns on said screen which are substantially identical in configuration to one another, at least a portion of each of said test patterns having its axis parallel to the direction in which one of said beams can be moved by adjustment of the beam-moving means associated therewith, and adjusting selected ones of said plurality of beam-moving means until said test patterns have predetermined relative positions.

2. A method of adjusting the relative positions of the areas of impingement of a plurality of electron beams on the screen of a cathode ray tube in which a plurality of electron beams are produced, said tube having associated therewith means for deflecting said beams over said screen and a plurality of adjustable means for moving corresponding ones of said beams in predetermined directions, said method comprising the steps of: modulating said beams so that they produce respective test patterns on said screen which have substantially the same configuration, at least a portion of the test pattern produced by each beam having its axis parallel to the direction in which another of said beams may be moved by adjustment of the beam-moving means associated therewith, adjusting the beam-moving means associated with a first of said beams until at least a part of the test pattern produced thereby substantially coincides with at least part of the test pattern produced by a second of said beams, adjusting the beam-moving means associated with said second beam until the test pattern produced thereby substantially coincides with the test pattern produced by said first beam, and adjusting the beam-moving means associated with the others of said beams until the respective test patterns produced by said other beams substantially coincide with the test patterns produced by said first and second beams.

3. A method of adjusting the relative positions of the areas of impingement of a plurality of electron beams on the screen of a cathode ray tube in which a plurality of electron beams are produced, said tube having associated therewith means for deflecting said beams in a predetermined scanning pattern and a plurality of adjustable means for moving corresponding ones of said beams in respective predetermined directions, said method comprising the steps of: modulating a first and a second of said beams to cause them to produce respective substantially identical first and second test patterns on said screen, said first and second test patterns each having corresponding first and second portions, the first portion of said first pattern and the second portion of said second pattern being respectively parallel to the directions in which said first and second beams are movable by said adjustable means, the second portion of said first pattern and the first portion of said second pattern being respectively parallel to the directions in which said second and first beams are movable by said adjustable means, adjusting the beam-moving means associated with said first beam until the second portion of said first test pattern at least partly coincides with the second portion of said second pattern, adjusting the beam-moving means associated with said second beam until said second pattern coincides with said first pattern, modulating selected others of said plurality of beams so that said beams respectively produce other test patterns substantially identical to said first and second test patterns, and adjusting selected ones of the beam-moving means associated with others of said beams until said other test patterns substantially coincide with said first and second test patterns.

4. A method of adjusting the relative positions of the areas of impingement of a plurality of electron beams on the screen of a cathode ray tube in which a plurality of electron beams are produced, said tube having associated therewith means for deflecting said beams in a predetermined scanning pattern over said screen and a plurality of adjustable means for moving corresponding ones of said beams in respective predetermined directions, said method comprising the steps of: modulating first and second ones of said beams to cause them to produce respective substantially identical first and second test patterns on said screen, said first and second test patterns including a plurality of substantially rectilinear configurations, the configurations of said first and second patterns respectively including corresponding first and second portions, the first portions of the configurations of said first patterns and the second portions of the configurations of said second pattern being respectively parallel to the directions in which said respective first and second beams are movable by said adjustable means, the second portions of the configurations of said first pattern and the first portions of the configurations of said second pattern being respectively parallel to the directions in which said respective second and first beams are movable by said adjustable means, adjusting the beam-moving means associated with said first beam until the second portions of the configurations of said first pattern at least partly coincide with the second portions of the configurations of said second pattern, adjusting the beam-moving means associated with said second beam until the configurations of said second pattern coincide substantially with the configurations of said first pattern, modulating a third of said plurality of beams to cause it to produce a third test pattern comprising configurations substantially identical to the configurations of said first and second test patterns, and adjusting the beam-moving means associated with said third beam until the configurations of said third test pattern substantially coincide with the configurations of said first and second test patterns.

5. A method of adjusting the relative positions of the areas of impingement of a plurality of electron beams on the screen of a cathode ray tube in which means for producing a plurality of electron beams is disposed, said tube having therein a fluorescent screen having a plurality of sets of phosphor elements, the phosphors of each set being capable of emitting light of a predetermined color in response to the impingement of electrons thereupon, said tube also having an apertured mask between said plurality of beam-producing means and said screen, said tube having associated therewith means for deflecting said beams so that said beams scan said screen through the apertures of said mask in a predetermined scanning pattern, said tube also having associated therewith a plurality of adjustable means for moving corresponding ones of said beams in respective predetermined directions, said method comprising the steps of: modulating a first and second of said beams to cause them to produce respective substantially identical first and second test patterns on said screen which are in first and second colors, said first and second test patterns each having corresponding first and second portions, the first portion of said first test pattern and the second portion of said second pattern being parallel to the respective directions in which said first and second beams are movable by said adjustable means, the second portion of said first pattern and the first portion of said second pattern being parallel to the respective directions in which said respective second and first beams are movable by said adjustable means, adjusting the beam-moving means associated with said first beam until the second portions of said first and second test patterns at least partly coincide, adjusting the beam-moving means associated with said second beam until said second pattern coincides with said first pattern, modulating others of said plurality of beams so that said beams produce respective test patterns substantially identical to said first and second test patterns but differing in color therefrom, and adjusting selected ones of the beam-moving means associated with selected others of said beams until said other test patterns substantially coincide with said first and second test patterns.

6. The invention according to claim 5 wherein all of said test patterns include configurations having the shape of inverted V's.

7. The invention according to claim 6 wherein the legs of the inverted V-shaped configurations are displaced from one another by 120°.

8. A method of adjusting the relative positions of the areas of impingement of a plurality of electron beams on the screen of a cathode ray tube in which a plurality of electron beams are produced, said tube having associated therewith means for deflecting said beams over said screen and a plurality of adjustable means for moving corresponding ones of said beams in predetermined directions, said method comprising the steps of: modulating a first and a second of said beams so that said beams produce a first set of test patterns on said screen which have substantially the same configuration, the test patterns of said first set both having corresponding portions disposed substantially parallel to the direction in which said first beam may be moved by adjustment of the beam-moving means associated therewith, adjusting the beam-moving means associated with said second beam until the test pattern produced thereby substantially coincides with the test pattern produced by said first beam, modulating said first and second beams so that said beams produce a second set of test patterns on said screen which have substantially the same configuration, the test patterns of said second set both having corresponding portions disposed substantially parallel to the direction in which said second beam is movable by adjustment of the beam-moving means associated therewith, adjusting the beam-moving means associated with said first beam until the test pattern of said second set produced thereby substantially coincides with the test pattern of said second set produced by said second beam, modulating said first and second beams and selected others of said beams so that said beams produce other sets of test patterns all the patterns of each set having substantially the same configuration and corresponding portions thereof disposed substantially parallel to the direction in which a predetermined one of said selected other beams is movable by the beam-moving means associated therewith, and adjusting the beam-moving means associated with said predetermined beam until the test pattern produced thereby substantially coincides with the other test patterns of the set.

9. A method of adjusting the relative positions of the areas of impingement of a plurality of electron beams on the screen of a cathode ray tube in which three electron beams are produced, said tube having associated therewith means for deflecting said beams over said screen and means for moving a first and second one of said three beams in first and second predetermined directions, said tube also having associated therewith adjustable means for moving a third of said three beams in third and fourth mutually perpendicular directions, said method comprising the steps of: modulating said first and second beams so that they respectively produce substantially identical first and second test patterns on said screen, said first and second test patterns comprising a plurality of luminous lines which are parallel to said first direction, adjusting the beam-moving means associated with said second beam until said second test pattern coincides with said first test pattern, modulating said first and second beams so that they respectively produce third and fourth substantially identical test patterns comprising a plurality of luminous lines parallel to said second direction adjusting the beam-moving means associated with said first beam until said third test pattern substantially coincides with said fourth test pattern, modulating the said first, second and third beams so that they respectively produce fifth, sixth and seventh substantially identical test patterns, each of which comprises a plurality of lines parallel to said third direction, adjusting the beam-moving means associated with said third beam until the seventh test pattern produced thereby coincides with the fifth and sixth test patterns produced by said first and second beams, modulating said first, second and third beams, so that they respectively produce eighth, ninth and tenth test patterns each of which comprises a plurality of lines parallel to said fourth direction, and adjusting the beam-moving means associated with said third beam until the tenth test pattern produced thereby coincides with said eighth and ninth test patterns.

10. A method of adjusting the relative positions of the areas of impingement of a plurality of electron beams on the screen of a cathode ray tube in which a plurality of electron beams are produced, said tube having associated therewith means for deflecting said beams over said screen and a plurality of adjustable means for moving corresponding ones of said beams in predetermined directions, said method comprising the steps of: modulating two of said beams so that they produce respective first test patterns on said screen which have substantially the same configuration, at least a portion of the test pattern produced by each of said two beams having its axis parallel to the direction in which the other of said beams may be moved by adjustment of the beam-moving means associated therewith, adjusting the beam-moving means associated with the first of said two beams until at least a part of the test pattern produced thereby substantially coincides with at least part of the test pattern produced by a second of said two beams, adjusting the beam-moving means associated with said second beam until the test pattern produced thereby substantially coincides with the test pattern produced by said first beam, modulating said beams so that they produce second test patterns all of which have a configuration different from that of said first test patterns, and adjusting the beam-moving means associated with a selected one of the other beams until the respective second test pattern produced by said selected other beam substantially coincides with the second test patterns produced by said first and second beams.

11. A method of adjusting the relative positions of the areas of impingement of a plurality of electron beams on the screen of a cathode ray tube in which a plurality of electron beams are produced, said tube having associated therewith means for deflecting said beams in a predetermined scanning pattern over said screen and a pluraility of adjustable means for moving corresponding ones of said beams in a given number of respective predetermined directions said method comprising the steps of: modulating said beams so that they produce respective test patterns on said screen which are substantially identical in configuration to one another, each of said patterns having a number of portions each of which is parallel to a corresponding one of said predetermined directions, and adjusting selected ones of said plurality of beam-moving means until said test patterns have predetermined relative positions.

References Cited in the file of this patent

UNITED STATES PATENTS

| | | |
|---|---|---|
| 2,525,077 | Morton | Oct. 10, 1950 |
| 2,648,724 | Enslein | Aug. 11, 1953 |
| 2,707,248 | Goodrich | Apr. 26, 1955 |
| 2,715,155 | Bryan | Aug. 9, 1955 |
| 2,742,589 | Goodrich | Apr. 17, 1956 |
| 2,768,318 | Bradley et al. | Oct. 23, 1956 |
| 2,819,419 | De Lano et al. | Jan. 7, 1958 |

OTHER REFERENCES

"Intro. to Color T.V.," Kaufman and Thomas, 1954, Rider pub., pp. 132, 133.

"Color T.V. Receiver-Model 21CT-55," RCA Service Data, 11-24-54, pp. 7-10.